United States Patent
Chen et al.

(10) Patent No.: US 10,952,499 B2
(45) Date of Patent: Mar. 23, 2021

(54) ICE SLIP RESISTANCE FORMULA AND PROCESS

(71) Applicant: Honeywell International Inc., Morris Plains, NJ (US)

(72) Inventors: Steve Chen, Shanghai (CN); Jeremy Shi, Shanghai (CN); Jex Zhang, Shanghai (CN); Linan Zhao, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 155 days.

(21) Appl. No.: 16/062,218

(22) PCT Filed: Jan. 27, 2016

(86) PCT No.: PCT/US2016/015087
§ 371 (c)(1),
(2) Date: Jun. 14, 2018

(87) PCT Pub. No.: WO2017/131658
PCT Pub. Date: Aug. 3, 2017

(65) Prior Publication Data
US 2019/0000184 A1    Jan. 3, 2019

(51) Int. Cl.
*A43B 13/26*     (2006.01)
*A43B 13/22*     (2006.01)
(Continued)

(52) U.S. Cl.
CPC ............ *A43B 13/26* (2013.01); *A43B 13/223* (2013.01); *B29D 35/0054* (2013.01);
(Continued)

(58) Field of Classification Search
CPC .......... C08K 7/14; C08K 3/013; A43B 13/04; A43B 13/22; A43B 13/26; A43B 13/223;
(Continued)

(56) References Cited

U.S. PATENT DOCUMENTS 4,427,831 A    1/1984 Komuro et al.
5,091,125 A    2/1992 Harada et al.
(Continued)

FOREIGN PATENT DOCUMENTS

CN    1871966 B    5/2010
FR    2402426 A1    4/1979
(Continued)

OTHER PUBLICATIONS

International Application No. PCT/US2016/015087, International Search Report, dated Oct. 19, 2016, 3 pages.
(Continued)

*Primary Examiner* — Camie S Thompson
(74) *Attorney, Agent, or Firm* — Alston & Bird LLP

(57) ABSTRACT

Embodiments relate generally to a traction surface and methods for forming the traction surface. The traction surface may comprise a compound material comprising glass fibers oriented orthogonal to the surface of the compound material extending from the compound material, wherein when the traction surface contacts an icy surface, the glass fibers are operable to penetrate a liquid-like top layer of the icy surface to provide grip with an ice layer below the liquid-like top layer. The method for forming the traction surface may comprise integrating glass fibers into a compound material; orienting the glass fibers within the compound material such that the glass fibers are oriented approximately orthogonal to the surface of the compound material; splitting the compound material to expose the glass fibers, wherein the glass fibers extend from the surface of the compound material; and forming the split compound material into a traction surface.

10 Claims, 3 Drawing Sheets

(51) Int. Cl.
  *B29C 35/00* (2006.01)
  *B29D 35/14* (2010.01)
  *B29D 35/12* (2010.01)
  *B29K 21/00* (2006.01)
  *B29K 509/08* (2006.01)
  *B29L 31/50* (2006.01)
  *B29D 35/00* (2010.01)

(52) U.S. Cl.
  CPC ....... *B29D 35/0063* (2013.01); *B29D 35/122* (2013.01); *B29D 35/128* (2013.01); *B29D 35/14* (2013.01); *B29D 35/142* (2013.01); *B29D 35/148* (2013.01); *B29C 2793/009* (2013.01); *B29K 2021/00* (2013.01); *B29K 2509/08* (2013.01); *B29L 2031/504* (2013.01)

(58) Field of Classification Search
  CPC ............ B29K 2009/06; B29K 2011/00; B29K 2105/12; B29K 2509/08; B29L 2031/50; B29L 2031/504; C08L 21/00
  USPC ............ 428/295.1, 297.4; 36/32 R; 523/150; 264/108, 45.3
  See application file for complete search history.

(56) References Cited

U.S. PATENT DOCUMENTS

| | | |
|---|---|---|
| 5,530,040 A | 6/1996 | Ross |
| 6,497,261 B1 | 12/2002 | Fukushima et al. |
| 2010/0088929 A1 | 4/2010 | Comoli |
| 2011/0094128 A1 | 4/2011 | Lagrand et al. |
| 2011/0258886 A1 | 10/2011 | Moon |

FOREIGN PATENT DOCUMENTS

| | | | |
|---|---|---|---|
| JP | H0416906 U | | 2/1992 |
| JP | 2010-099212 | * | 5/2010 |
| JP | 2015-172157 | * | 10/2015 |
| WO | 2017131658 A1 | | 8/2017 |

OTHER PUBLICATIONS

International Application No. PCT/US2016/015087, Written Opinion of the International Searching Authority, dated Oct. 19, 2016, 6 pages.
International Application No. PCT/US2016/015087, International Preliminary Report on Patentability, dated Aug. 9, 2018, 8 pages.
Europe Patent Application No. 16707994.6, Communication pursuant to Rules 161(1) and 162 EPC, dated Nov. 22, 2018, 3 pages.
CN Office Action, including Search Report, dated Mar. 31, 2020 for CN Application No. 201680080478.
English Translation of CN Office Action dated Mar. 31, 2020 for CN Application No. 201680080478.
English translation of CN Search report dated Mar. 25, 2020 for CN Application No. 201680080478.
CN Office Action dated Nov. 2, 2020 for CN Application No. 201680080478.
English Translation of CN Office Action dated Nov. 2, 2020 for CN Application No. 201680080478.

* cited by examiner

ICE SLIP RESISTANCE FORMULA AND PROCESS

CROSS-REFERENCE TO RELATED APPLICATIONS

The present application is the National Stage ref International Application No. PCT/US2016/015087 filed on Jan. 27, 2016 and entitled "Ice Slip Resistance Formula And Process" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In work areas where there is potential for ice forming on the ground surfaces, workers may wear slip resistant footwear to help prevent slipping on the icy surfaces. These work areas may include outdoor and indoor areas. Additionally, other devices or protective equipment may be used in the areas where ice may be likely to form, and these devices may comprise slip resistant elements, or elements providing traction.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
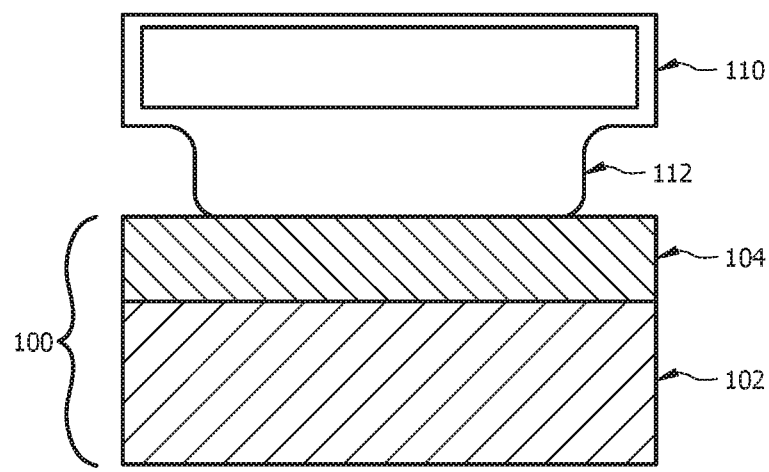
FIG. 1 illustrates an embodiment of a surface contacting a ground surface.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for forming a traction surface comprises glass fibers extending from at least one surface of the traction surface.

Slip and fall accidents and associated injuries on icy and snowy surfaces are common among workers in outdoor areas, or in cold indoor areas that may have ice formation on the ground surfaces. Compared with other slippery surface, such as a wet surface, icy and snowy surface have unique challenges. In the solid state (less than 0° C., at 1 atm), the polar nature of the $H_2O$ (water) molecule results in dangling surface hydrogen bonds and significant structural disorder that manifests itself as a quasi-liquid layer on bulk ice at a wide range of temperatures and humidity conditions. This means that even though ice may be harder than the outsole of a shoe, there is always a liquid-like layer of water acting as an efficient lubricant between the ice surface and the outsole surface. This may cause the friction to be dramatically decreased and cause potential slip issues. A common way to increase grip for footwear includes using cleats, spike and studs on the bottom surface of the outsole. These products grip the ice by fracturing and penetrating it beyond the liquid-like surface layer, to provide excellent traction. However, those solutions cannot be used for indoor surface because the gripping elements may scratch the indoor floor surface, such as wood, ceramic, tile, etc.

Applicants have developed a traction surface operable to penetrate the liquid-like surface layer to provide improved traction. Additionally, the traction surface may be operable to prevent damage the floor or ground surfaces. In some embodiments, the traction surface may comprise flexibility in low temperature (−40° C.), heat resistance (300° C.) and fully meet the ASTM, EN and GB standard.

The traction surface may comprise glass fibers dispersed in a compound material to be used in a slip resistance outsole, wherein the glass fibers may extend out of the surface of the compound material. The glass fibers may be oriented vertically, or orthogonal to the surface of the traction surface. The glass fibers may be operable to penetrate the liquid-like surface layer and provide grip on the ice layer. The traction surface may be formed by orienting the glass fibers within the compound, which may comprise more than one step, and splitting the compound to expose the glass fibers.

Referring now to FIG. 1, a typical embodiment of a surface 110 is shown, wherein the surface 110 is operable to contact a ground surface 100 that comprise a layer of ice 102 as well as a layer of melted ice (or liquid) 104. In this embodiment, the portion 112 of the surface 110 that contacts the ground surface 100 only contacts the liquid layer 104. The liquid layer 104 may be extremely slippery, and without any gripping elements, the surface 110 may easily slide on the ground surface 100, creating a dangerous situation for a user.

Figure 2:
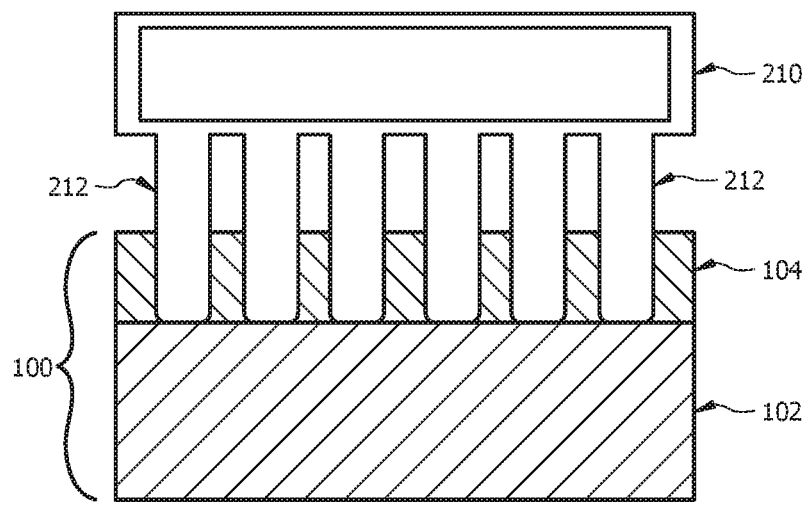
FIG. 2 illustrates a traction surface contacting a ground surface according to an embodiment of the disclosure.

Referring now to FIG. 2 another embodiment of a traction surface 210 is shown. The traction surface 210 may comprise one or more gripping elements 212 attached to or incorporated into the traction surface 210. When the traction surface 210 contacts the ground surface 100, the gripping elements 212 may be operable to penetrate through the liquid layer 104 to the ice layer 102. In some embodiments, the gripping elements 212 may extend vertically from the traction surface 210. In some embodiments, the gripping elements 212 may be operable to penetrate the liquid layer 104 without damaging the ground surface 100.

In some embodiments, the gripping elements 212 may comprise glass fibers extending from at least a portion of the traction surface 210. In some embodiments, the glass fibers 212 may be incorporated into the material of the traction surface 210 and may be vertically aligned to extend from the traction surface 210. In some embodiments, the traction surface 210 may comprise a portion of the outsole of a shoe. In some embodiments, the traction surface 210 may comprise a plug or attachment operable to be attached to the outsole of a shoe. In some embodiments, the traction surface 210 may comprise approximately 10% of the surface of an outsole of a shoe. In another embodiment, the traction surface 210 may comprise any surface that may benefit from ice slip resistance and/or heat contact protection, such as shoes, gloves, equipment surfaces, etc.

Referring now to FIGS. 3-6, a method for forming a traction surface (as described above) is shown. However, in other embodiments, a traction surface comprising glass fibers extending from the traction surface may be formed by other methods. Additionally, some of the following steps may be omitted, or may occur in another order, and additional steps may be added.

Figure 3:
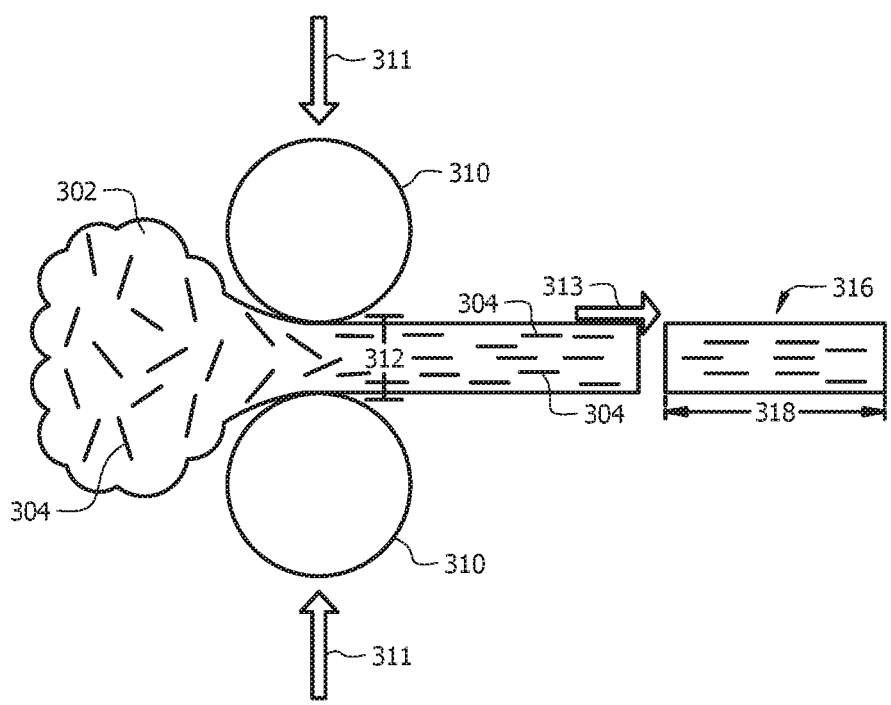
FIG. 3 illustrates a step in forming a traction surface according to an embodiment of the disclosure.

In FIG. 3 glass fibers 304 may be incorporated into a compound material 302 and fed through a roller system 310. In some embodiments, the compound material 302 may comprise a rubber material. In some embodiments, the compound material 302 may comprise a plastic material. In some embodiments, the compound material may comprise additives, fillers, activators, and other elements that may provide desired characteristics to the compound material, such as heat resistance, low temperature flexibility, oil resistance, and/or abrasion resistance characteristics. The glass fibers 304 may be spread throughout the compound material 302. By feeding the compound 302 and glass fibers 304 through the roller system 310, the glass fibers may be oriented within the compound 302.

In some embodiments, the opening 312 between the rollers may be less than the length of one of the glass fibers 304. For example, the glass fibers may be approximately 2 to 3 millimeters (mm) long, which the opening 312 may be approximately 1 mm in width. In some embodiments, the rollers 310 may exert pressure in the directions indicated by arrows 311. Additionally, the rolled compound 302 may be pulled with tensile force in the direction indicated by arrow 313. In some embodiments, the compound 302 may be heated as it passes through the roller system 310. For example, the compound may be heated to approximately 60-70° C. In some embodiments, the compound 302 may be rolled through a roller system 310 multiple times. In some embodiments, the compound 302 may be rolled through a roller system 310 approximately 10 times.

In some embodiments, the glass fibers 304 may be oriented parallel to the edges or surfaces of the rolled compound 302. As shown in FIG. 3, once the compound 302 has been rolled (possibly multiple times) through a roller system 310, the compound 302 may be cut at a predetermined length 318 to form a block 316. In some embodiments, the length 318 may be approximately 10 mm. In other embodiments, the length 318 may be less than 10 mm. In still other embodiments, the length 318 may be more than 10 mm.

Figure 4:
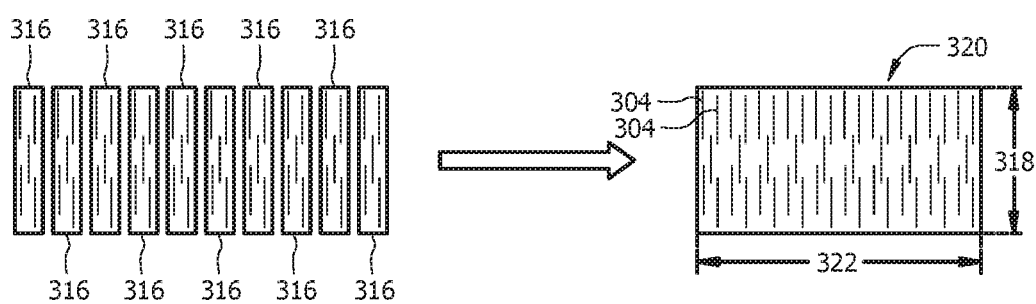
FIG. 4 illustrates another step in forming a traction surface according to an embodiment of the disclosure.

As shown in FIG. 4, a plurality of blocks 316 may be stacked and compressed together to form a bulk 320 of a desired width 322. The dimensions of the bulk 320 that is formed may depend on the desired dimensions of the finished traction surface (described above). In some embodiments, the width 322 may be approximately 100 mm. As shown in FIG. 4, by stacking the blocks 316, the glass fibers 304 may be oriented orthogonal to the outer surface of the bulk 320. In some embodiments, the bulk 320 may be vulcanized.

Figure 5:
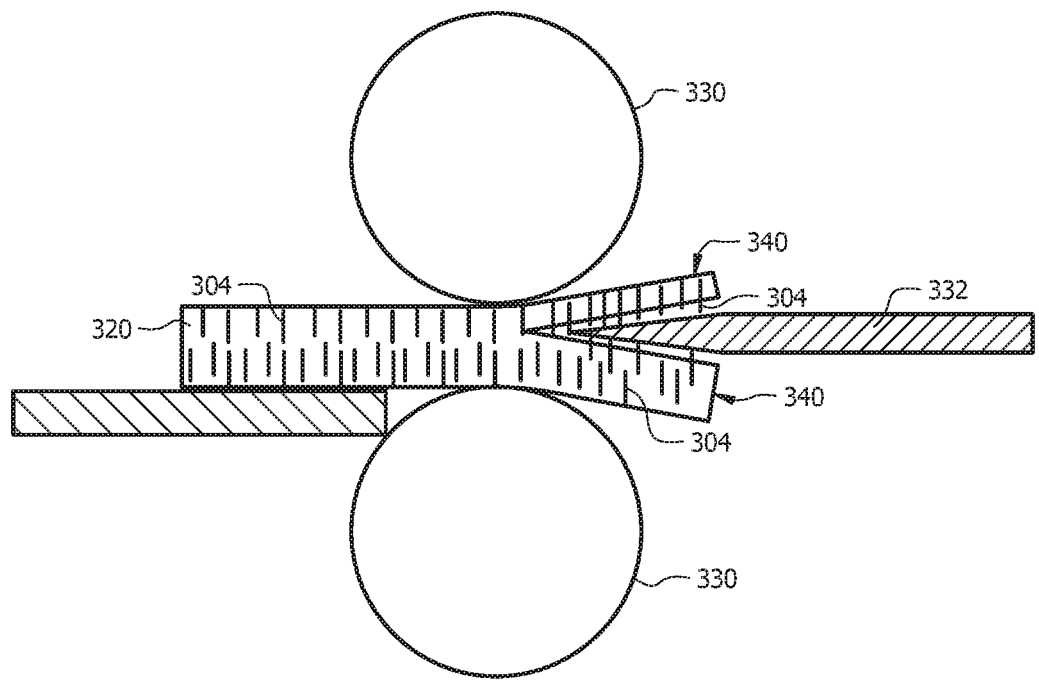
FIG. 5 illustrates another step in forming a traction surface according to an embodiment of the disclosure.

As shown in FIG. 5, the bulk 320 may then be split to expose the glass fibers 304. The bulk 320 may be fed through a splitting system 330 comprising a splitter 332 (or knife). The bulk 320 may be split one or more times to create a sheet 340 having the glass fibers 304 extended from at least one surface of the sheet 340. In some embodiments, the glass fibers 304 may be exposed by splitting the bulk 320 in a direction orthogonal to the orientation of the glass fibers 304.

Figure 6:
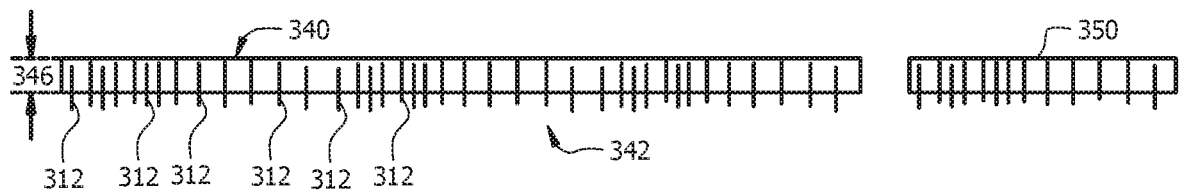
FIG. 6 illustrates yet another step in forming a traction surface according to an embodiment of the disclosure.

As shown in FIG. 6, the sheet 340 may have the glass fibers 304 extending from at least one surface 342 of the sheet 340. In some embodiments, the thickness 346 of the sheet 340 may be approximately 2 mm. In some embodiments, the lengths of the exposed glass fibers 304 (or the length that the glass fibers 304 extend from the surface 342) may be between approximately 250 and 450 micrometers (μm). In some embodiments, the sheet 340 may be further cut or shaped to form a traction surface 350 that may be attached to an outsole of a shoe, for example. The size and shape of the traction surface 350 may be adjusted to fit the application and desires of a user.

Embodiments of the disclosure may include a traction surface comprising a compound material with glass fibers oriented orthogonal to the surface of the compound material extending from the compound material, wherein when the traction surface contacts an icy surface, the glass fibers are operable to penetrate a liquid-like top layer of the icy surface to provide grip with an ice layer below the liquid-like top layer. In some embodiments, the glass fibers may extend approximately 250 to 450 micrometers from the surface of the compound material. In some embodiments, the compound material may comprise a vulcanized rubber material. In some embodiments, the compound material may comprise a plastic material.

In some embodiments, the glass fibers may be oriented within the compound material by rolling the glass fibers through a roller system, wherein the opening of the roller system is less than the length of the glass fibers. In some embodiments, the glass fibers may be further oriented within the compound material by stacking blocks of the compound material together and compressing the blocks together. In some embodiments, the glass fibers may be exposed on at least one surface of the compound material by splitting the compound material in a direction orthogonal to the orientation of the glass fibers. In some embodiments, the traction surface may be incorporated into an outsole for footwear. In some embodiments, the traction surface may comprise a plug operable to attach to an element that will contact icy surfaces.

Embodiments of the disclosure may also include a method for forming a traction surface. In some embodiments, glass fibers may be integrated into a compound material. In some embodiments, the glass fibers may be oriented within the compound material such that the glass fibers are oriented approximately orthogonal to the surface of the compound material. In some embodiments, the compound material may be split to expose the glass fibers, wherein the glass fibers may extend from the surface of the compound material. In some embodiments, the split compound material may be formed into a traction surface.

In some embodiments, the compound material may be fed through a roller system to form a sheet, wherein the glass fibers may be oriented approximately parallel to the surface of the sheet, and wherein the opening in the roller system is less than the length of the glass fibers. In some embodiments, the rolled sheet may be cut into blocks. In some embodiments, a plurality of the blocks may be stacked and compressed together to form a bulk, wherein the glass fibers are oriented orthogonal to the surface of the bulk. In some embodiments, the compound material may be fed through a roller system multiple times to further orient the glass fibers. In some embodiments, the compound material may be heated while it is fed through the roller system. In some embodiments, the traction surface may comprise at least a portion of an outsole for footwear. In some embodiments, the glass fibers may be operable to penetrate through a liquid-like top layer of an icy surface to provide grip below the liquid-like top layer.

In some embodiments, the compound material may comprise a rubber compound material, and the method may further comprise vulcanizing the rubber compound material. In some embodiments, additives, fillers, and/or activators may be incorporated into the compound material.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A traction surface comprising:
   a compound material comprising a plastic material; and
   glass fibers, the glass fibers oriented orthogonal to a surface of the compound material extending between approximately 250 to 450 micrometers from the compound material,
   wherein:
      when the traction surface contacts an icy surface, the glass fibers are operable to penetrate a liquid top layer of the icy surface to provide grip with an ice layer below the liquid top layer, and
      the entire traction surface is formed of the compound material and at least a portion of the glass fibers.

2. The traction surface of claim 1, wherein the traction surface is formed of a sheet having the glass fibers extending from at least one surface of the sheet.

3. The traction surface of claim 2, wherein the sheet comprises a thickness of approximately 2 millimeters.

4. The traction surface of claim 1, wherein the glass fibers are oriented within the compound material by rolling the glass fibers through a roller system, wherein an opening of the roller system is less than a length of the glass fibers.

5. The traction surface of claim 4, wherein the glass fibers are further oriented within the compound material by stacking blocks of the compound material together and compressing the blocks together.

6. The traction surface of claim 1, wherein the glass fibers are exposed on at least one surface of the compound material by splitting the compound material in a direction orthogonal to an orientation of the glass fibers.

7. The traction surface of claim 1, wherein the traction surface is incorporated into an outsole for footwear.

8. The traction surface of claim 1, wherein the traction surface comprises a plug operable to attach to an element that will contact icy surfaces.

9. The traction surface of claim 1, wherein the compound material further comprises a vulcanized rubber material.

10. A traction surface comprising:
a compound material comprising a plastic material; and
glass fibers, the glass fibers oriented orthogonal to a surface of the compound material extending between approximately 250 to 450 micrometers from the compound material,
wherein:
when the traction surface contacts an icy surface, the glass fibers are operable to penetrate a liquid top layer of the icy surface to provide grip with an ice layer below the liquid top layer,
the entire traction surface is formed of the compound material and at least a portion of the glass fibers, and
the traction surface comprises a plug operable to attach to an element that will contact icy surfaces.

* * * * *